Figure 1:
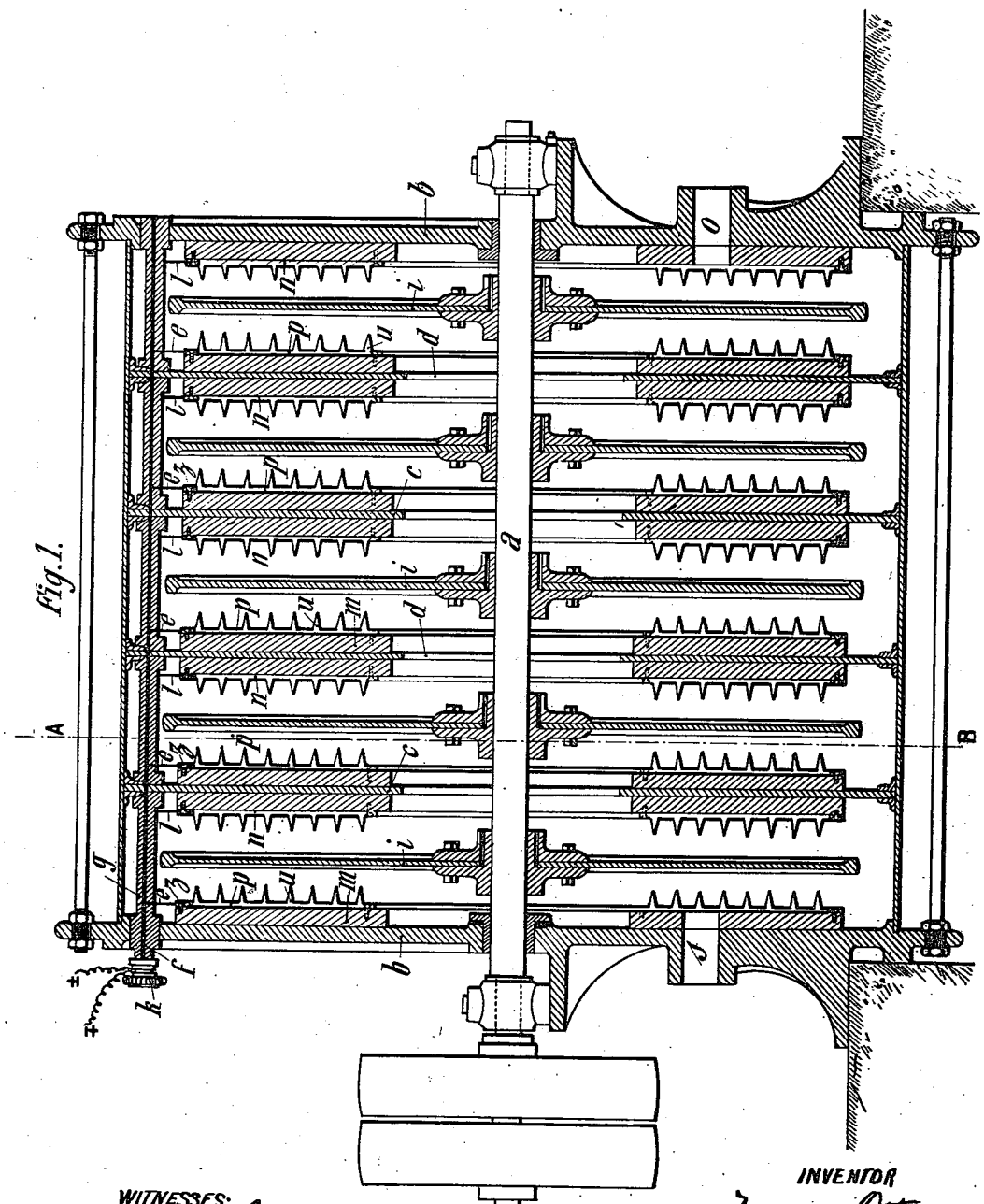

No. 640,694. Patented Jan. 2, 1900.
M. OTTO.
APPARATUS FOR PRODUCING ELECTRIC DISCHARGES.
(Application filed Mar. 30, 1899.)
(No Model.) 5 Sheets—Sheet 1.

No. 640,694. Patented Jan. 2, 1900.
M. OTTO.
APPARATUS FOR PRODUCING ELECTRIC DISCHARGES.
(Application filed Mar. 30, 1899.)

(No Model.) 5 Sheets—Sheet 2.

WITNESSES:

INVENTOR
Marius Otto
By Richardson
ATTORNEYS

No. 640,694. Patented Jan. 2, 1900.
M. OTTO.
APPARATUS FOR PRODUCING ELECTRIC DISCHARGES.
(Application filed Mar. 30, 1899.)
(No Model.) 5 Sheets—Sheet 4.

No. 640,694. Patented Jan. 2, 1900.
M. OTTO.
APPARATUS FOR PRODUCING ELECTRIC DISCHARGES.
(Application filed Mar. 30, 1899.)
(No Model.) 5 Sheets—Sheet 5.

WITNESSES:
Ella L. Giles

INVENTOR
Marius Otto
BY Richards & Co
ATTORNEYS

UNITED STATES PATENT OFFICE.

MARIUS OTTO, OF NEUILLY-SUR-SEINE, FRANCE.

APPARATUS FOR PRODUCING ELECTRIC DISCHARGES.

SPECIFICATION forming part of Letters Patent No. 640,694, dated January 2, 1900.

Application filed March 30, 1899. Serial No. 711,126. (No model.)

*To all whom it may concern:*

Be it known that I, MARIUS OTTO, a citizen of the Republic of France, residing at Neuilly-sur-Seine, (Seine,) France, have invented certain new and useful Improvements in Apparatus for the Production of Electric Discharges, of which the following is a specification.

In the specification of Letters Patent previously granted to me and numbered 599,455, filed June 15, 1897, I described an apparatus for the production in a continuous manner of diffused electric discharges. I indicated the advantages possessed by this apparatus, especially in the preparation of ozone, over known apparatus, in which, in order to prevent the formation of arcs, short circuits, and luminous discharges between electrodes of opposite signs, it is necessary to have recourse to the employment of fixed dielectrics for separating the said electrodes.

In my aforesaid specification I pointed out that the characteristic principle of the invention therein described consisted in a relative arrangement of the electrodes of opposite signs such that the discharge could take place only during intervals of time sufficiently short to prevent the formation of short circuits and to break automatically any arcs that might be formed. I pointed out also that one of the simplest means of producing the successive startings and interruptions of the discharges between the various points of the surfaces of the opposing electrodes consisted in moving them relatively to one another, either by giving both sets a continuous movement or by giving only one half of them a continuous displacement relatively to the other half or opposite sign. I also described various means by which this principle might be carried into practice.

Now this present invention relates to apparatus for attaining the same object as the apparatus with movable electrodes described in my aforesaid specification—that is to say, the continuous production of diffused electric discharges in the apparatus.

The fundamental principle—that is to say, the gradual and successive startings and interruptions of the discharges between the various opposing points of the electrodes of the apparatus—remains unchanged; but the means of practically realizing the same that I employ in the apparatus that I am about to describe are different.

For the production of the gradual and successive startings and interruptions of the discharge I arrange movable separating-disks between the fixed electrodes. These separating-disks are divided into sectors such that their passage between the opposing faces of the electrodes successively allows the discharge to take place or, on the contrary, renders the discharge impossible.

It will be readily understood that if the electrodes of opposite signs are sufficiently far apart that normally, unless the surrounding gaseous medium be heated, the discharge cannot occur between them, although the discharge would become possible if a conducting-disk of suitable thickness were interposed, it will be sufficient in order to bring about the gradual and successive startings and interruptions of the discharge to cause a conducting-disk, with alternate full sectors and open sectors, to move between the electrodes so arranged at a distance. On the other hand, if the electrodes of opposite signs are normally so close together as to permit the discharge to take place between them the gradual and successive startings and interruptions can be produced by the passage between these electrodes of an insulating-disk of suitable thickness with alternate full sectors and open sectors.

I have shown, by way of example in the accompanying drawings, apparatus for producing electric discharges constructed in accordance with these principles and capable of being utilized in the industrial preparation of ozone and other gases.

Figure 2:
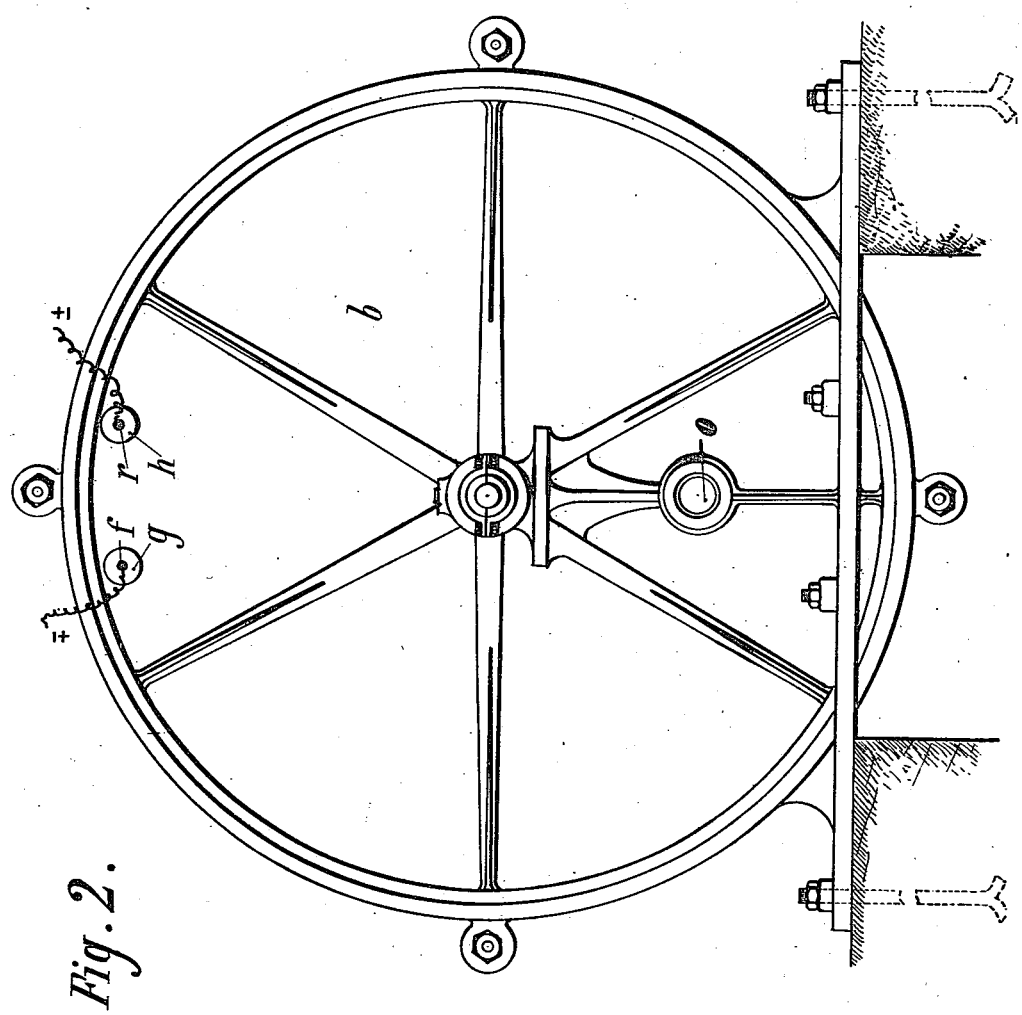
Figure 3:
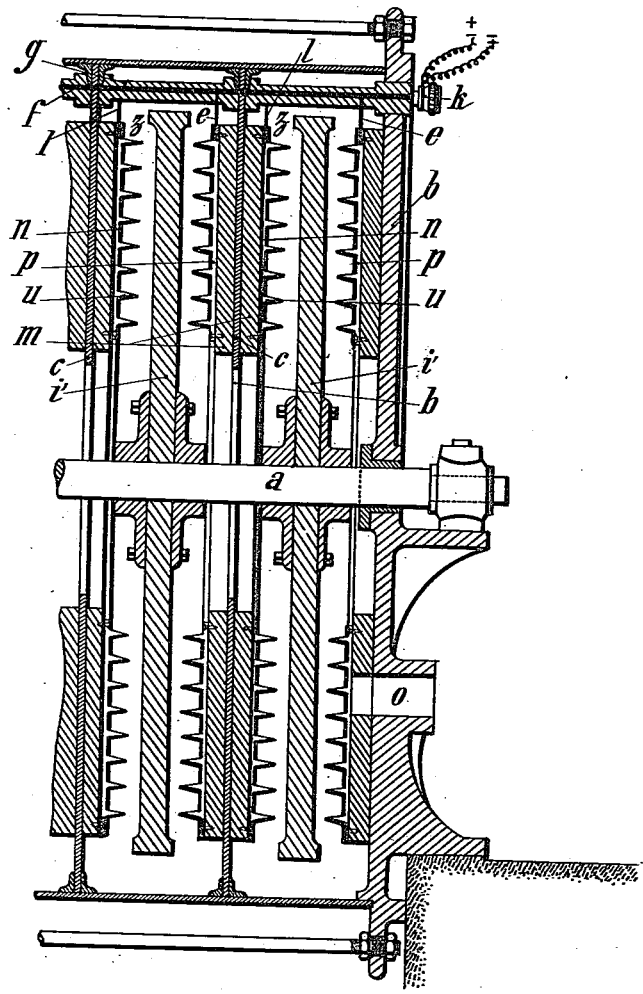
Figure 4:
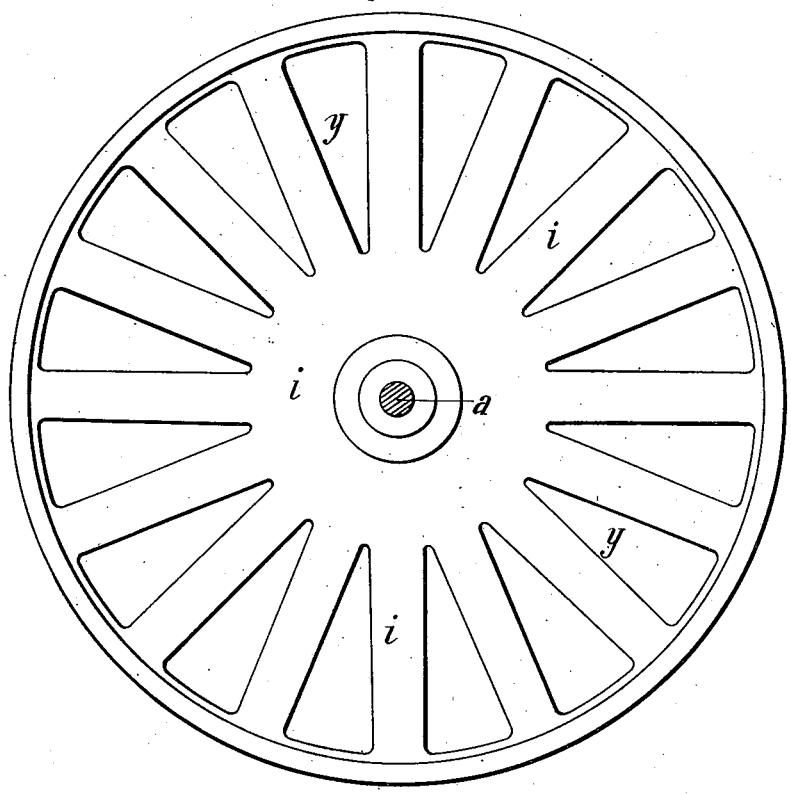
Figure 5:
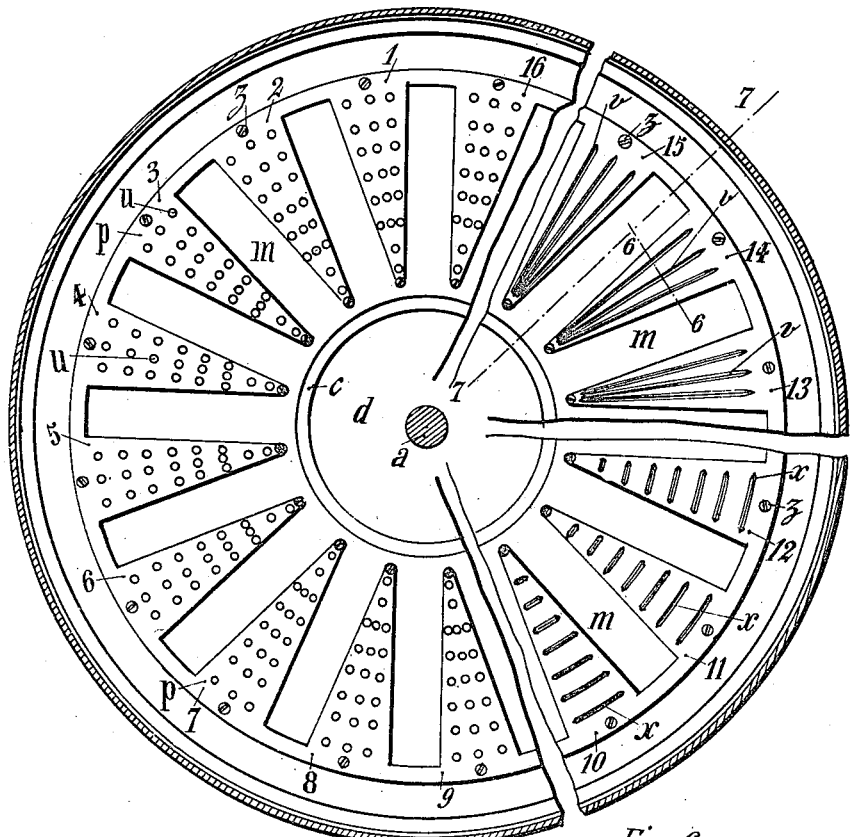
Figure 7:
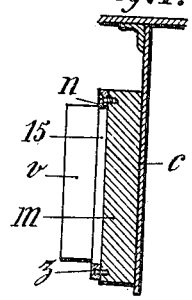
Figure 6:

Figure 1 is a longitudinal section, and Fig. 2 an end elevation, of an apparatus for interrupting and starting the discharges. Fig. 3 is a central longitudinal section showing the electrodes arranged close together. Fig. 4 is a face view of one of the plates. Fig. 5 is a section on line A B of Fig. 1. Figs. 6 and 7 are detail sectional views on lines 6 6 and 7 7 of Fig. 5.

In Fig. 1 the electrodes of opposite signs $p$ and $n$ are sufficiently far apart to render all direct occurrence of the discharge between the points of these electrodes impossible. The apparatus comprises a cast-iron box $b$, divided into a certain number of similar compartments by partitions $c$, each having a central orifice $d$ for the circulation of the gas. Each compartment has two electrodes $p$ and $n$, fixed, respectively, to the two partitions of the compartment, the two end electrodes being fixed to the inner sides of the end walls of the box $b$. Two metallic conductors $f$ $r$ are arranged in corresponding insulating-sleeves $g$ $h$. The electrodes $p$ are connected by a wire $e$ to the conductor $f$ and the electrodes $n$ by a wire $l$ to the conductor $r$, the current being taken from the extremities of the conductors $f$ $r$ by means of binding-screws $k$. The electrodes (of which one is shown in detail in Fig. 5, which is a cross-section according to the line A B of Fig. 1) may, for instance, be composed of metallic circular disks cut up in a manner so as to form triangular sectors 1 2 3 4 5, &c., separated by empty spaces and only connected at their base. These sectors are provided with points $u$ in variable number, and the disk as a whole is fixed by a screw $z$ on an insulating-disk $m$, which in turn is fixed on the portion $c$. Instead of points $u$ there can be arranged on the metallic sectors $p$ and $n$ beveled blades, which may be considered as points infinitely approached along radii, as shown at $v$ on part of Fig. 5 on the sectors 13 14 15, for instance, or along arcs, as indicated at $x$ on another part of the same figure, (sectors 10 11 12.) Figs. 6 and 7 are sectional partial elevations, respectively, along lines 6 6 and 7 7 of Fig. 5.

On a shaft $a$ of the apparatus are mounted, midway between the electrodes $p$ and $n$, separating-disks $i$, Fig. 4. These disks consist of a conducting-plate having alternately full sectors $i$ and open sectors $y$. The number of the full sectors is equal to the number of the point-sectors of the electrodes. The sectors $y$ instead of being entirely open can be provided with a very thin sheet of insulating material. In this way the disk $i$ makes a more complete baffle for the circulation of the air or the oxygen which enters through the orifice $o$ to be collected as ozone at $s$. The disks $i$ being rotated by the shaft $a$, the discharges pass between the points of the electrodes $p$ and $n$ so long as the full sectors $i$ of the disks are between these points; but as soon as an open sector $y$ comes between them the discharge is interrupted.

In the example shown in Fig. 3 the electrodes $p$ and $n$ are normally sufficiently close together to enable the discharge to pass between their points without the interposition of a conductor. In this case the movable separating-disks $i$ are consequently composed of insulating-plates having alternate full sectors and open sectors, the openings of which can be covered with a very thin conducting-sheet.

It is obvious that the details of construction—such as the number, the shape, and the relative dimensions of the electrodes and the arrangement of their conducting-surface—may vary and that such variations may result in corresponding modifications in the details of the movable separating-disks $i$ or $i'$.

Having now particularly described and ascertained the nature of the said invention and in what manner the same is to be performed, I declare that what I claim is—

The herein-described apparatus for the continuous production of electrical discharges, comprising the fixed electrodes and the movable separating-disks located between said electrodes and having alternate portions arranged respectively to permit the discharge to pass between the electrodes and to interrupt the same, substantially as described.

In witness whereof I have hereunto set my hand in presence of two witnesses.

MARIUS OTTO.

Witnesses:
EDWARD P. MACLEAN,
EMILE BERT.